United States Patent
Perie et al.

(10) Patent No.: US 6,834,954 B2
(45) Date of Patent: Dec. 28, 2004

(54) SPECTACLES OF THE TYPE WITHOUT A SURROUND

(75) Inventors: Jean-Claude Perie, Montauban (FR); Hervé Tiberghien, Menton (FR); Robert Dalex, Mereville (FR)

(73) Assignee: Minima, Linas (FR)

( * ) Notice: Subject to any disclaimer, the term of this patent is extended or adjusted under 35 U.S.C. 154(b) by 0 days.

(21) Appl. No.: 10/646,168

(22) Filed: Aug. 22, 2003

(65) Prior Publication Data

US 2004/0051840 A1 Mar. 18, 2004

(30) Foreign Application Priority Data

Aug. 28, 2002 (FR) .............................. 02 10680

(51) Int. Cl.⁷ .............................................. G02C 5/22
(52) U.S. Cl. ........................ 351/153; 351/110; 16/118
(58) Field of Search ...................... 351/63, 110, 153; 16/228

(56) References Cited

U.S. PATENT DOCUMENTS

| | | | |
|---|---|---|---|
| 6,428,166 B2 | 8/2002 | Tiberghien | 351/153 |
| 6,439,717 B2 | 8/2002 | Weber | 351/110 |
| 6,755,523 B1 | 6/2004 | Wiedner | 351/63 |

FOREIGN PATENT DOCUMENTS

| | | | | |
|---|---|---|---|---|
| EP | 0426006 A2 | 5/1991 | | |
| EP | 0666490 A1 | 8/1995 | | |
| EP | 0718660 A1 | 6/1996 | | |
| EP | 0997763 A1 | 5/2000 | | |
| EP | 1107042 A1 | 11/2000 | | |
| EP | 1120678 A1 | 8/2001 | | |
| EP | 1164410 A1 | 12/2001 | | |
| EP | 1180712 A1 | 2/2002 | | |
| EP | 1186935 A1 | 3/2002 | | |
| FR | 2751431 | 1/1998 | | |
| FR | 2810748 | 12/2001 | | |
| GB | 2168499 A | 6/1986 | | 351/153 |
| WO | 01/20388 A1 | 3/2001 | | |
| WO | 01/53877 A1 | 7/2001 | | |
| WO | 01/96935 A1 | 12/2001 | | |
| WO | 02/06882 A1 | 1/2002 | | |
| WO | 02/29474 A1 | 4/2002 | | |
| WO | 02/33474 A1 | 4/2002 | | |
| WO | 02/46830 A1 | 6/2002 | | |
| WO | WO 02/061495 A1 | 8/2004 | | 351/153 |

*Primary Examiner*—Huy Mai
(74) *Attorney, Agent, or Firm*—McCormick, Paulding & Huber LLP

(57) ABSTRACT

The invention provides spectacles of the type without a surround, comprising a bridge interconnecting two lenses, and two hinged side arms, each side arm being mounted to pivot about a horizontal axis that is oblique, between a deployed position for use and a folded position against the inside surfaces of the lenses. In accordance with the invention, each side arm is connected to the corresponding lens via a hinge link of one-piece structure, said link having an inner portion fixed against the inside surface of the lens and prevented from turning relative thereto, and an outer portion offset laterally from said lens, with said side arm being hinged to the back of said outer portion via a terminal eyelet of the side arm.

12 Claims, 5 Drawing Sheets

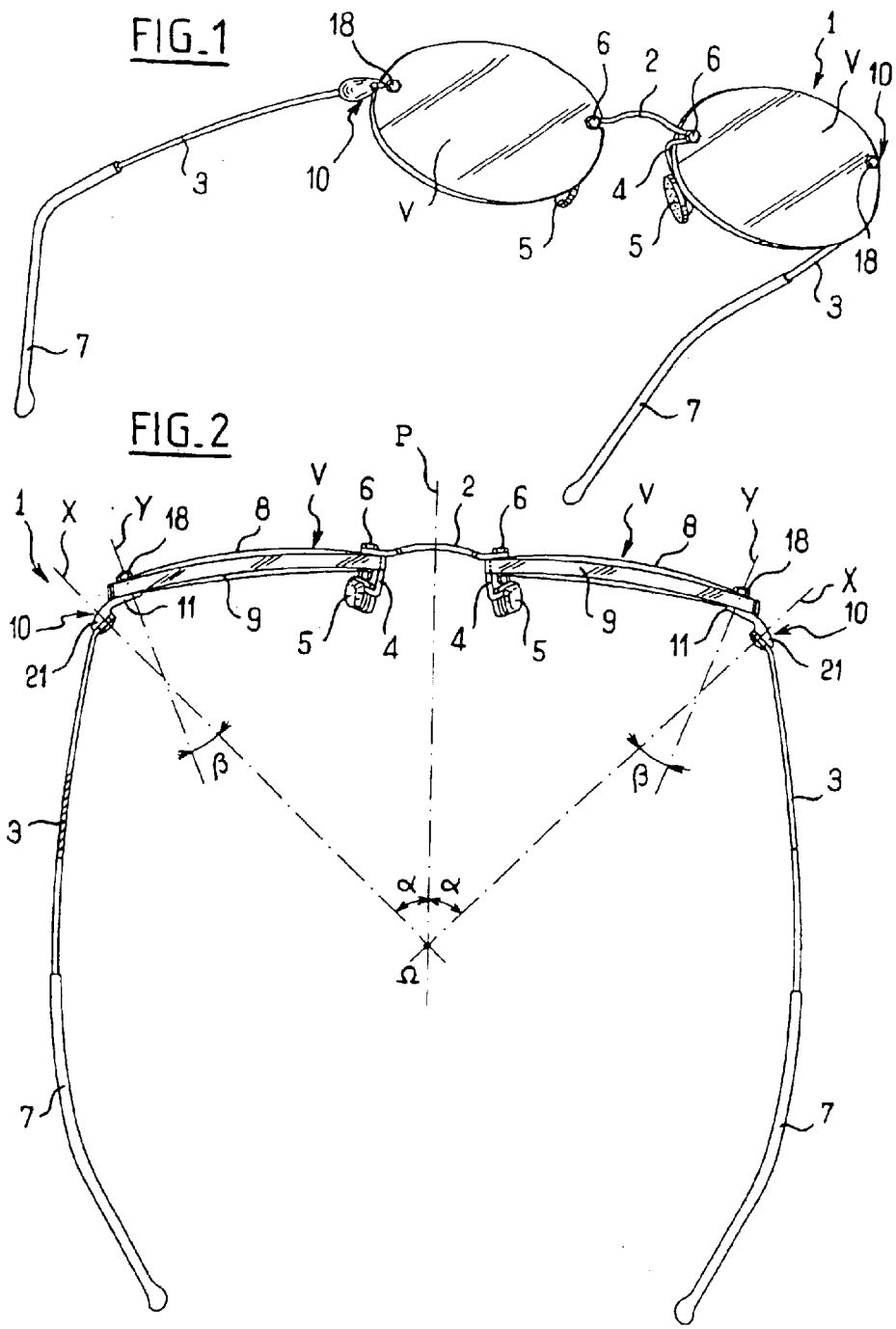

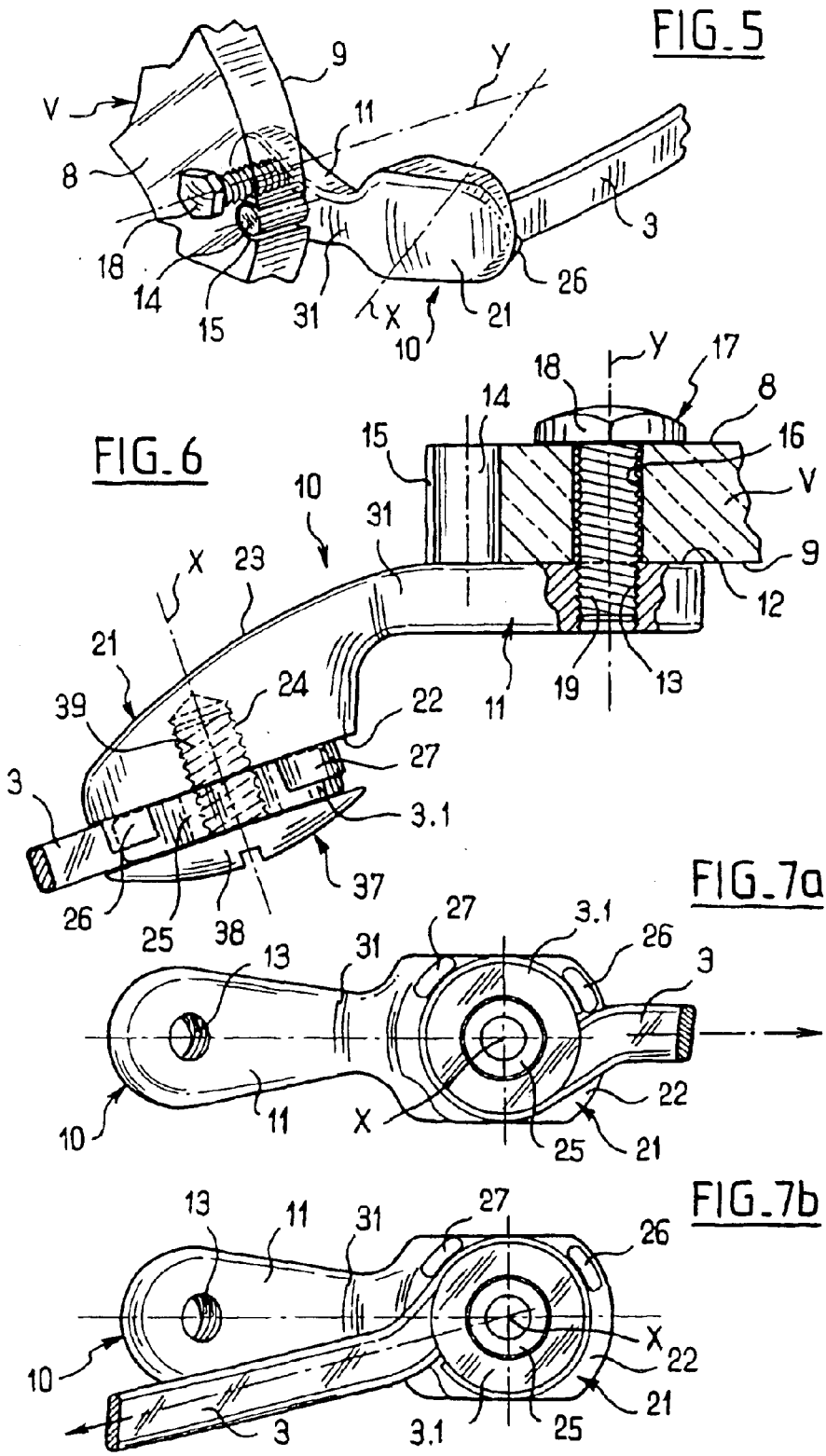

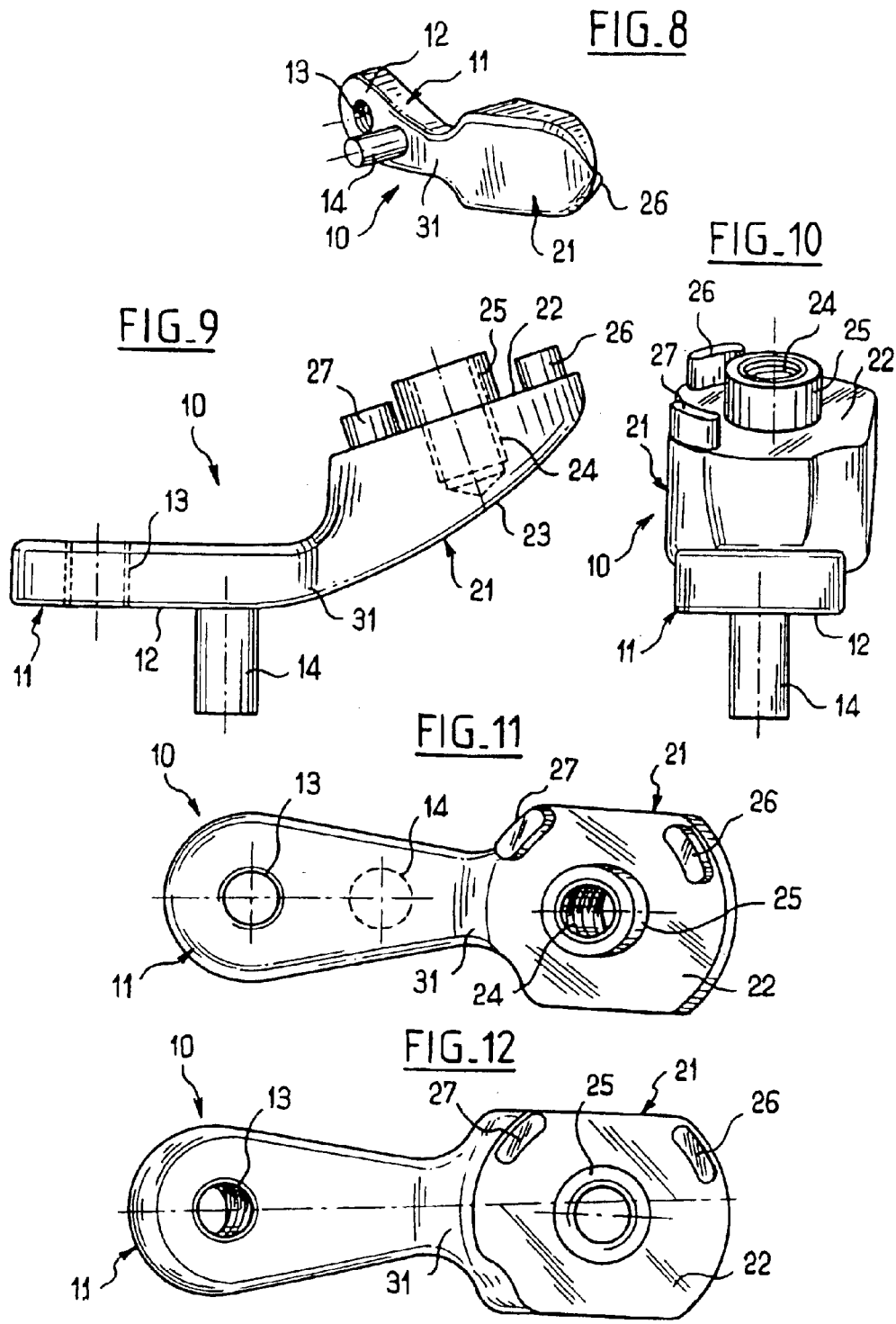

SPECTACLES OF THE TYPE WITHOUT A SURROUND

This application is entitled to the benefit of and incorporates by reference essential subject matter disclosed in French Patent Application No. 02 10680 filed on Aug. 28, 2002.

FIELD OF THE INVENTION

The present invention relates to the field of spectacles of the type without a surround, comprising a bridge interconnecting two lenses, and two hinged side arms or "temples".

BACKGROUND OF THE INVENTION

Rimless spectacles are said to be without a surround, or to be "hole-mounted" when holes are made through the thickness of the lenses for the purpose of fixing them to the frame, and such glasses are becoming more and more widespread. For the technological background, reference can be made to the following documents: WO-A-01/53877; FR-A-2 751 431; EP-A-0 666 490; EP-A-0 718 660; EP-A-0 997 763; WO-A-01/20388; EP-A-1 120 678; EP-A-1 107 042; WO-A-01/06935; EP-A-1 186 935; EP-A-1 164 410; FR-A-2 810 748; WO-A-02/46830; WO-A-02/33474; WO-A-02/29474; and EP-A-1 180 712.

Attention has more recently been paid to spectacles of the type without a surround in which the side arms are mounted to pivot about an axis that is horizontal and oblique.

Thus, document EP-A-0 426 006 describes spectacles comprising lenses secured to a frame including firstly a lens engagement portion, and secondly arms formed by cylindrical rods connected to the engagement portion by angled portions. Thus, each arm pivots around a conical trajectory about the axis of the screw connecting the arm to the angled portion, between a deployed position for the arm which is then perpendicular to the engagement portion, and a folded position for the arm which is then parallel to the engagement portion. The hinge under such circumstances is totally integrated in the arm and in the angled portion. However, such an arrangement relies on having arms and angled portions of relatively large section, and much greater than the section of wire arms, such that that configuration is not applicable to spectacles having a wire frame.

That consideration has led the Applicant to devise another type of spectacles in which the side arms are mounted to pivot about a horizontal axis that is oblique, said side arms being of wire design. Document U.S. Pat. No. 6,428,166 in the name of the Applicant thus describes an arrangement in which each arm has a hinge end shaped as an eyelet occupying a vertical plane intersecting a general longitudinal direction of the arm, and a hinge bearing is fixed to an inside surface of the corresponding lateral zone to receive the eyelet pivotally about an axis that is substantially normal to said inside surface. Under such circumstances, each hinged side arm is mounted to pivot between a deployed position for use and a folded position where it lies against the inside surfaces of the lenses. This makes it possible specifically to obtain a folded position that is very compact, enabling the spectacles to be stored in a case that is flat and slightly curved.

The above-mentioned arrangement described in document U.S. Pat. No. 6,428,166 in the name of the Applicant uses hinge elements which bear directly against the inside surfaces of the lenses, such that the inclination of the oblique pivot axes of the arms depends, in fact, on the radius of curvature of the lenses where the hinge bearings engage them. This is of little importance when such an arrangement is used for making sunglasses without correcting lenses, in which case curved lenses are used of curvature that does not vary. However, that arrangement is less advantageous when it is desired to use it with correcting lenses of curvature that can vary to a large extent depending on the amount of correction required by the user. As an indication, the radius of curvature of lenses in conventional use lies in the range 65 millimeters (mm) to 140 mm. In addition, it is necessary to use very marked curvature of the hinged side arms insofar as the hinge bearings which bear against the inside surfaces of the lenses cannot, as a result, present the slightest lateral offset from said lenses.

SUMMARY OF THE INVENTION

An object of the present invention is to devise spectacles of the type without a surround but avoiding the drawbacks and limitations mentioned above.

The invention thus provides spectacles of structure that can be assembled quickly and reliably, regardless of the type of lens involved, while remaining easy to handle when it is desired to cause the hinged side arms to pivot.

The invention achieves these objects and others by providing spectacles of the type without a surround, comprising a bridge interconnecting two lenses, and two hinged side arms, each side arm being mounted to pivot about a horizontal axis that is oblique, between a deployed position for use and a folded position against the inside surfaces of the lenses, the spectacles being remarkable in that each side arm is connected to the corresponding lens via a hinge link of one-piece structure, said link having an inner portion fixed against the inside surface of the lens and prevented from turning relative thereto, and an outer portion offset laterally from said lens, with said side arm being hinged to the back of said outer portion via a terminal eyelet of the side arm.

The use of such a one-piece link considerably simplifies storage and assembly, insofar as it suffices to assemble the side arm onto the corresponding link, and then assemble said link to the corresponding lens.

Preferably, the inner portion of each hinge link is fixed to the corresponding lens by a through screw, turning being prevented by a through finger projecting from said inner portion. In particular, the inner portion may present tapping associated with the through screw whose shank passes through a hole in the lens, and the finger of said inner portion may be received in a lateral notch in said lens. Such an embodiment makes it possible to use a type of machining that is becoming more and more widespread for spectacles of the type without a surround, in which mode of machining a through hole is formed in the vicinity of each side edge of the lens together with an open side notch placed in the vicinity of said hole.

Advantageously, the outer portion of each hinge link presents a rear facet extending in a vertical plane that is oblique, and against which the terminal eyelet of the corresponding side arm is held. In particular, the outer portion presents a cylindrical finger projecting from the rear facet, with the terminal eyelet of the side arm being mounted thereon, said terminal eyelet being held by means of a screw whose shank passes into a tapped hole formed on the axis of said cylindrical finger. In a variant, the outer portion receives a grub screw having threaded ends, and presenting a central portion that is smooth, the grub screw projecting from the rear facet and having the terminal eyelet of the side arm mounted thereon, said terminal eyelet being held in place by a nut screwed onto the free end of said grub screw. The presence of this rear facet on each hinge link makes it possible to guarantee accurate positioning in three dimensions for the terminal eyelet of each side arm.

According to another advantageous characteristic, the rear facet further presents one or two abutment-forming projections for engaging the side arm and serving to define the range over which said side arm can pivot between its deployed position and its folded position. This makes it possible to avoid the presence of an additional part such as a washer, having lugs acting as abutments, thereby enabling the link to continue to be in, the form of a one-piece, unitary structure by integrating the angular abutment system.

Preferably, the outside portion of each hinge link presents a smooth convex front facet. This smooth convex front facet is clearly visible from the front face when looking at the wearer of the spectacles because this portion of the hinge link is offset laterally relative to the outside edge of the lens. This front facet thus also contributes to appearance, and this is important in the field of spectacles.

Also advantageously, the inner portion and the outer portion of each hinge link together form an obtuse-angled bend, and are connected together by a central portion which presents ductility enabling the angular position of said outer portion to be adjusted relative to said inner portion. This enables terminal adjustment to be very accurate as a function of the particular curvature of the correcting lenses concerned.

Also preferably, each hinge link is made as a casting of stainless steel casting, and includes a central portion that has been subjected to annealing treatment.

Finally, advantageously, each side arm is made of titanium wire of section that is preferably flat for the terminal eyelet and its portion adjacent to said eyelet. This makes it possible to have excellent guidance for the terminal eyelet and makes it easy to manipulate the side arms for pivoting purposes.

Other characteristics and advantages of the invention appear more clearly in the light of the following description and the accompanying drawings, relating to a particular embodiment.

BRIEF DESCRIPTION OF THE DRAWINGS

Reference is made to the figures of the accompanying drawings, in which:

FIG. 1 shows a pair of spectacles in accordance with the invention seen in a three-quarters perspective view, the side arms of said spectacles being in the deployed position for use;

FIG. 2 is a plan view of the same spectacles;

FIG. 5 is a perspective view on a larger scale of the zone including a hinge link;

FIG. 6 is a section of FIG. 5 on a horizontal midplane;

FIGS. 7a and 7b show two extreme positions of a hinged side arm, with two angular abutments associated with the hinge link;

FIGS. 8 to 12 are other views showing a hinge link of the above-mentioned type under various angles.

DETAILED DESCRIPTION OF THE INVENTION

Figure 3:
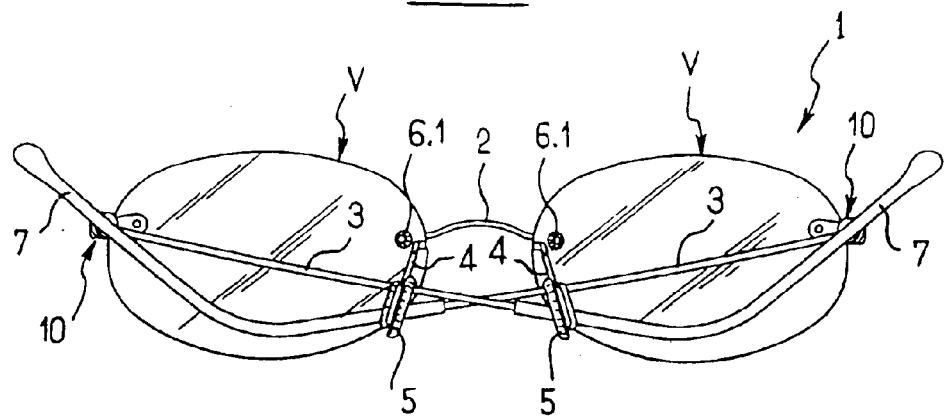
FIGS. 3 and 4 show the above-mentioned spectacles with the side arms in position folded against the inside surfaces of the lenses, FIG. 3 being a rear elevation view and FIG. 4 being a plan view.

FIGS. 1 to 4 show spectacles of the type without a surround, made in accordance with the invention. In conventional manner, these spectacles comprise a bridge 2 connecting together the two lenses V, and two hinged side arms 3. The bridge 2 has a central arch in the midplane P of the spectacles, and is terminated by two loops passing around the shanks of fixing bolts 6 on the front faces of the lenses V. In FIG. 3, there can be seen the associated nuts 6.1 which are tightened against the inside surfaces of the lenses V. The wire constituting the bridge 2 is extended rearwards beyond each of its loops by a portion that passes through a side notch in the lens in order to prevent turning, and then via a downwardly bent portion 4 terminating in a final loop for receiving a nosepad 5. The bridge 2 may be made using a wire structure based on round or flat wire, and in particular based on titanium wire.

Figure 4:
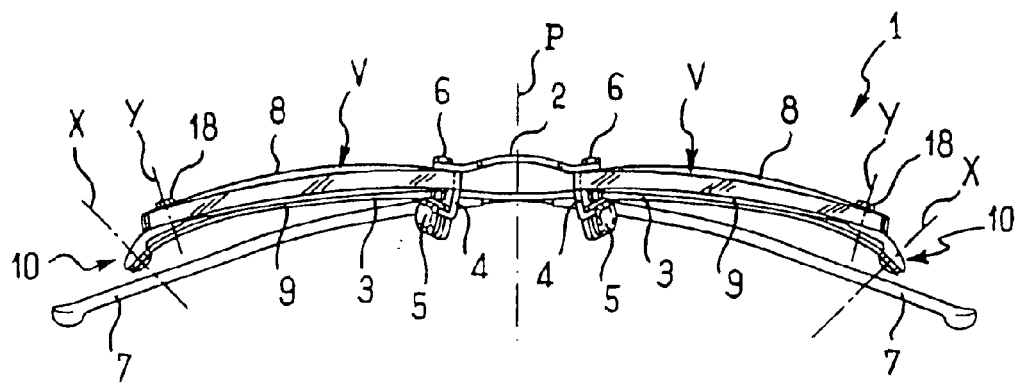
Figure 13A:
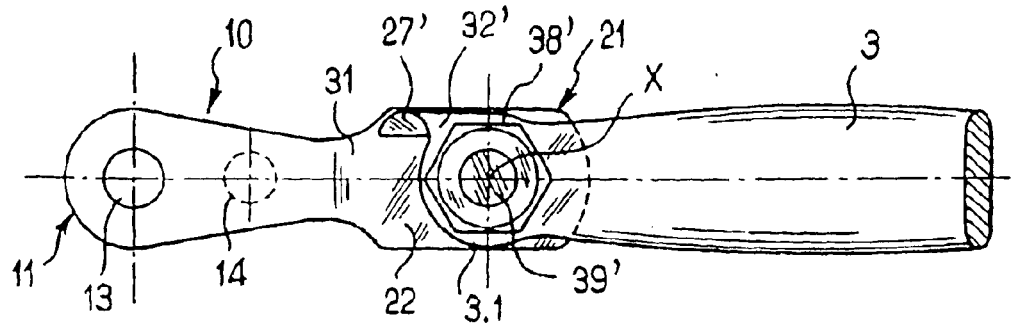
FIGS. 13a and 13b show the two extreme positions of a hinged side arm in a variant with a single angular abutment associated with the hinge link and with a modified pivot.
Figure 14A:
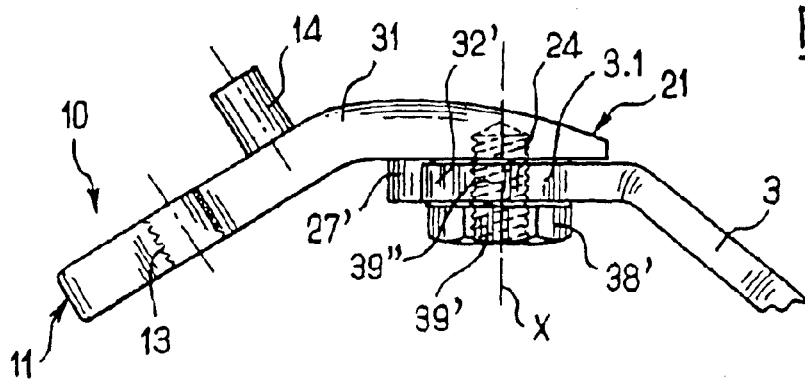
FIGS. 14a and 14b are the corresponding plan views.
Figure 13B:
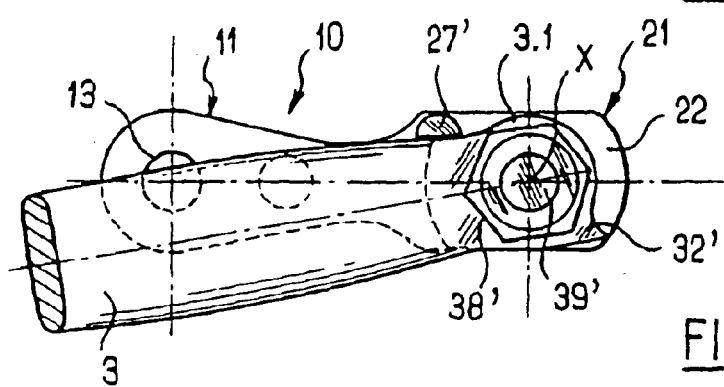
Figure 14B:
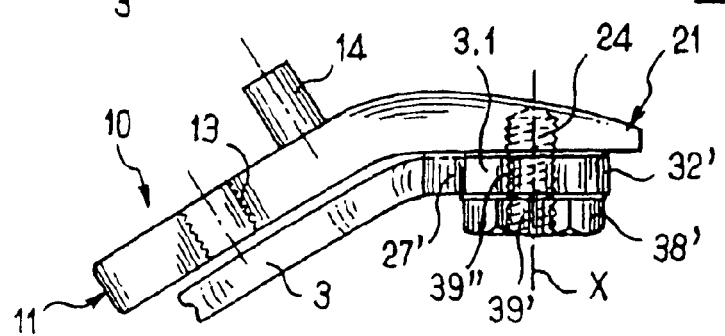

Each side arm 3 is mounted to pivot about an oblique horizontal axis referenced X between a deployed position for use (corresponding to FIGS. 1 and 2) and a position in which the arm is folded against the inside surfaces of the lenses V (corresponding to FIGS. 3 and 4). Specifically, each side arm 3 possesses an end earpiece 7, but in a variant it would also be possible to provide a simple terminating bead. Furthermore, reference 8 designates the outside or front surfaces of the lenses V and reference 9 the inside or rear surfaces of said lenses.

In accordance with an essential aspect of the invention, each side arm 3 is connected to the corresponding lens V by a hinge link 10 of one-piece structure, said link having a inner portion 11 fixed in such a manner as to prevent turning against the inside surface 9 of the lens V, and an outer portion 21 offset laterally away from said lens, with said side arm being hinged to the rear face thereof via a terminal eyelet 3.1 of the arm.

As can be seen more clearly in FIGS. 5 and 6, the inner portion 11 of each hinge link 10 is fixed to the corresponding lens V by a through screw 17, with turning being prevented by a through finger 14 projecting from said inner portion. Specifically, the inner portion 11 presents tapping 13 associated with the through screw 17. The shank 19 of the through screw 17 then passes through a through hole in the lens V and is screwed into said tapping 13 in the inner portion 11 until the edge 18 of the screw 17 comes to bear against the outside surface 8 of the lens V. The inside surface 9 of the lens V bears against a plane front face 12 of the inner portion 11 of the hinge link 10. Y designates the axis of the screw 17 and of the associated hole 16 and tapping 13. The finger 14 is of cylindrical structure and is received in a side notch 15 in the lens V, thus providing the desired anti-turning function. The assembly constituted by the through screw 17 and the through finger 14 holds the hinge link 10 in position relative to the lens V in extremely stable manner without any interfering play of said link against the inside surface of the lens.

Such a fixing system comprising a through hole 16 and a laterally open notch 15 formed in the lens V is now in widespread use for spectacles of the type having no surround. That system can thus be used in the context of the present invention.

The outer portion 21 of each hinge link 10 presents a rear facet 22 extending in an oblique vertical plane and against which the terminal eyelet 3.1 of the corresponding side arm 3 is held. Thus, whatever the angular position of the hinged side arm 3, its terminal eyelet 3.1 slides against the oblique vertical facet 22 of the hinge link 10, thus ensuring that the hinge axis referenced X remains constantly in the same direction.

The particular structure of the outer portion 21 of the hinge link 10 can be better understood with reference to FIGS. 8 to 12.

There can thus be seen a tapped blind hole 24 extending along the axis X perpendicularly to the plane of the oblique facet 22 for the purpose of receiving the threaded shank 39 of the associated holding screw 37. The outer portion 21 presents a cylindrical finger 25 projecting rearwards from the rear face 22, with the terminal eyelet 3.1 of the side arm 3 being mounted thereon so as to form a hinge pivot for the side arm concerned. As can be seen more clearly in the section view of FIG. 6, the terminal eyelet 3.1 of the side arm 3 is held in place by the screw 37, and more precisely by the head 38 of said screw, which screw has its threaded shank 39 received in axial tapping of the cylindrical finger 25 which is extended by the tapped blind hole 24 formed in the outer portion 21 on the same axis as the axis of the cylindrical finger 25, i.e. along the pivot axis X of the side arm 3. The screw is preferably locked in place by adhesive for greater security.

As shown in FIGS. 13a to 14b, it is possible in a variant to omit the cylindrical finger 25 and replace the screw 37 by a grub screw 39' tapped at both ends and having a smooth central portion 39" that constitutes the bearing for the terminal eyelet 3.1 of the corresponding side arm 3; one of the threaded ends of this grub screw is screwed into the tapped hole 24, and its other threaded end receives a retaining nut 38' which performs the same function as the head 38 of the screw 37. For security, adhesive is preferably used to lock both threaded ends of the grub screw 39'.

It is advantageous to be able to restrict the angular pivot range of each side arm 3 so as to prevent excessive pivoting going beyond the angle defined between the deployed position for use and the folded position for storage.

This function of restricting the angular pivot range could be performed by one or two superposed washers on the axis X presenting a lateral lug constituting an abutment. However, in order to avoid the presence of one or two additional components, provision is made in accordance with the invention for the rear facet 22 to present two abutment-forming projections 26, 27 for the side arm 3, serving to define the range of pivoting of said side arm between its deployed position and its folded position.

This can be better understood with reference to FIGS. 7a and 7b which are rear views looking along the hinge axis X, showing a side arm 3 respectively in the deployed position and in the folded position. In FIG. 7a, corresponding to the deployed position, the active abutment is the abutment 26, whereas in FIG. 7b, corresponding to the folded position, the active abutment is the abutment 27. The height of the abutments 26 and 27 (parallel to the axis X) is preferably slightly less than the width of the wire constituting the terminal eyelet of the arm, thereby not interfering with the holding in position performed by the head 38 of the retention screw 37 (or the nut 38' screwed onto the rear end of the grub screw 39' in the above-described variant).

In a variant, as shown in FIGS. 13a to 14b, the above-described system with two projecting abutments can be replaced by a single abutment 27' co-operating in the deployed position of the side arm with a spike 32' projecting from the terminal eyelet 3.1. For this purpose, the single abutment 27' is semicylindrical in section.

On its front face, the outer portion 21 presents a smooth convex facet referenced 23. In this example, this facet is slightly arched, and since it can be seen from in front given that it is offset laterally beyond the edge of the lens, it must also be pleasing for the appearance of the spectacles fitted therewith. Consequently, this front face 23 can be provided with various types of patterns in relief, it may be smooth, it may have indentations, stripes, etc. . . .

Thus, and thus as can be seen more clearly in FIGS. 6 and 9, the inner portion 11 and the outer portion 21 of each hinge link 10 form an acute-angled bend and are connected together by a central portion 31.

For the angles, reference can be made to FIG. 2 which shows the angle made by each arm pivot axis X relative to the vertical midplane P at their point of intersection $\Omega$, said angle $\alpha$ being about 45°. Each side arm 3 thus describes half of a conical sheet as it moves over its available angular pivot range about its axis X. The axis Y corresponding to a direction that is perpendicular to the inside surface of each lens V forms an angle $\beta$ relative to the axis X situated on the same side of the midplane P, and the value of the angle $\beta$ can vary, but is generally close to 25° for a radius of curvature of 87 mm in the corresponding zone of the inside surface 9 of the lens V.

It may be advantageous to provide for the central portion 31 interconnecting the inner portion 11 and the outer portion 21 of each hinge link 10 to present ductility suitable for enabling the terminal angle of said outer portion to be adjusted relative to said inner hinge. This enables an optician, during final fitting, to perform last-minute adjustments enabling the shape of the hinge link 10 to be matched exactly to the curvature of the correcting lenses concerned (i.e. to match the value of the obtuse angle of the bend formed between the two portions 11 and 21 of the link thereto), in such a manner that the side arms 3 extend in a generally direction that is perpendicular to the front plane when they are in the deployed position for use.

Provision can be made for each hinge link 10 to be made as a stainless steel casting, in which case it has a central portion 31 that is subjected to annealing treatment in order to impart the desired ductility so as to make the above-mentioned final adjustment possible.

As shown in the drawings, each side arm 3 is preferably made of titanium wire of section that is preferably flat for the terminal eyelet 3.1 and the portion of the arm adjacent to said eyelet. The remaining portion of each side arm, extending rearwards from halfway along it to the portion that is encased in the earpiece 7 may then be round in section since that makes it easier to put the earpieces into place, or to engage equivalent terminal beads.

The invention thus provides a structure for spectacles that enables any type of correcting lens to be mounted with a wire type frame, while maintaining the principle of side arms that pivot about respective horizontal axes that are oblique.

The invention is not limited to the embodiment described above, but on the contrary covers any variant using equivalent means to reproduce the essential characteristics specified above.

What is claimed is:

1. Rimless spectacles, comprising a bridge interconnecting two lenses, and two hinged side arms, each side arm being mounted to pivot about a horizontal axis that is oblique, between a deployed position for use and a folded position against the inside surfaces of the lenses, wherein each side arm is connected to the corresponding lens via a hinge link of one-piece structure, said link having an inner portion fixed against the inside surface of the lens and prevented from turning relative thereto, and an outer portion offset laterally from said lens, with said side arm being hinged to the back of said outer portion via a terminal eyelet of the side arm.

2. Spectacles according to claim 1, wherein the inner portion of each hinge link is fixed to the corresponding lens by a through screw, turning being prevented by a through finger projecting from said inner portion.

3. Spectacles according to claim 2, wherein the inner portion presents tapping associated with the through screw whose shank passes through a hole in the lens, and the finger of said inner portion is received in a lateral notch in said lens.

4. Spectacles according to claim 1, wherein the outer portion of each hinge link presents a rear facet extending in a vertical plane that is oblique, and against which the terminal eyelet of the corresponding side arm is held.

5. Spectacles according to claim 4, wherein the outer portion presents a cylindrical finger projecting from the rear facet, with the terminal eyelet of the side arm being mounted thereon, said terminal eyelet being held by means of a screw whose shank passes into a tapped hole formed on the axis of said cylindrical finger.

6. Spectacles according to claim 4, wherein the rear facet further presents two abutment-forming projections for engaging the side arm and serving to define the range over which said side arm can pivot between its deployed position and its folded position.

7. Spectacles according to claim 4, wherein the outer portion receives a grub screw having threaded ends, and presenting a central portion that is smooth, the grub screw projecting from the rear facet and having the terminal eyelet of the side arm mounted thereon, said terminal eyelet being held in place by a nut screwed onto the free end of said grub screw.

8. Spectacles according to claim 4, wherein the rear facet further presents a single abutment-forming projection for engaging the side arm and serving to define the range over which said side arm can pivot between its deployed position and its folded position.

9. Spectacles according to claim 4, wherein the outer portion presents a front facet that is smooth and convex.

10. Spectacles according to claim 1, wherein the inner portion and the outer portion of each hinge link together form an obtuse-angled bend, and are connected together by a central portion which presents ductility enabling the angular position of said outer portion to be adjusted relative to said inner portion.

11. Spectacles according to claim 10, wherein each hinge link is made as a casting of stainless steel, and includes a central portion that has been subjected to annealing treatment.

12. Spectacles according to claim 1, wherein each side arm is made of titanium wire of section that is substantially flat for the terminal eyelet and its portion adjacent to said eyelet.

* * * * *